May 22, 1962
R. S. DITTO
3,036,188
HEATING APPARATUS
Filed Feb. 24, 1959
3 Sheets-Sheet 1
*Fig. I*
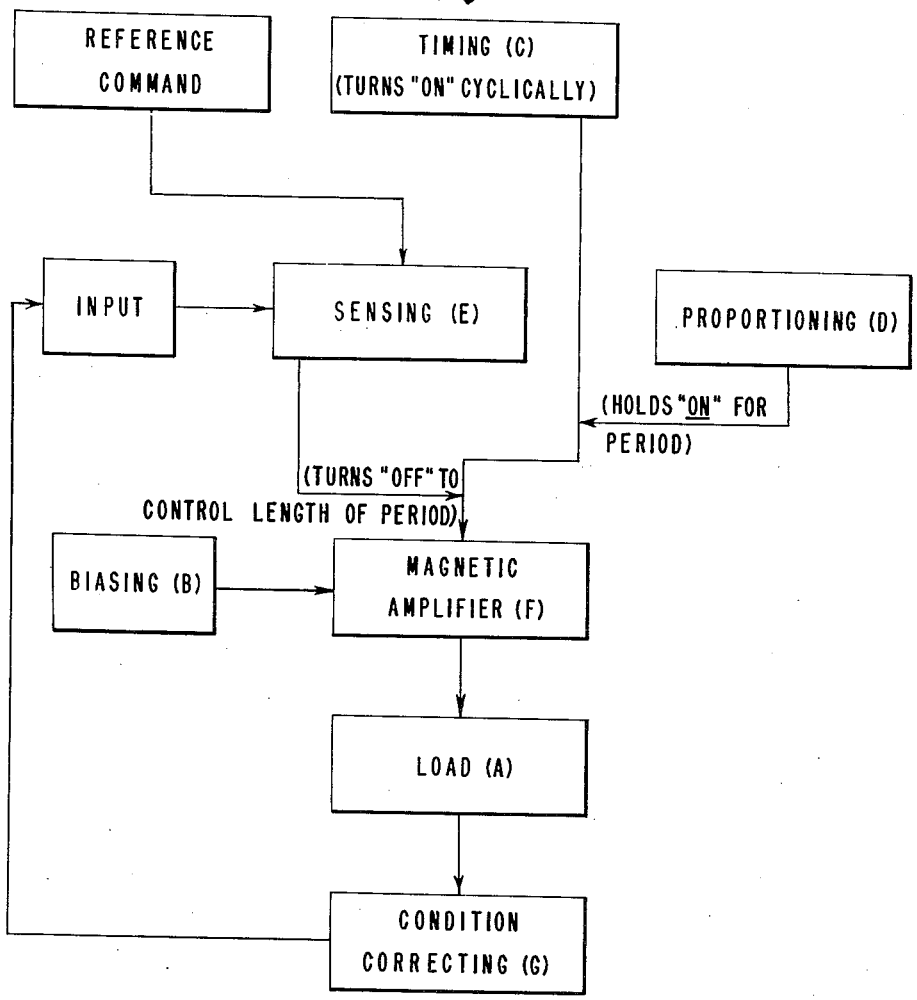
*Fig. II*
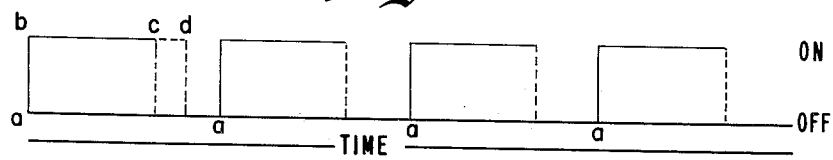
INVENTOR
RICHARD SHARTLE DITTO
BY *Carl A. Hechmer*
ATTORNEY

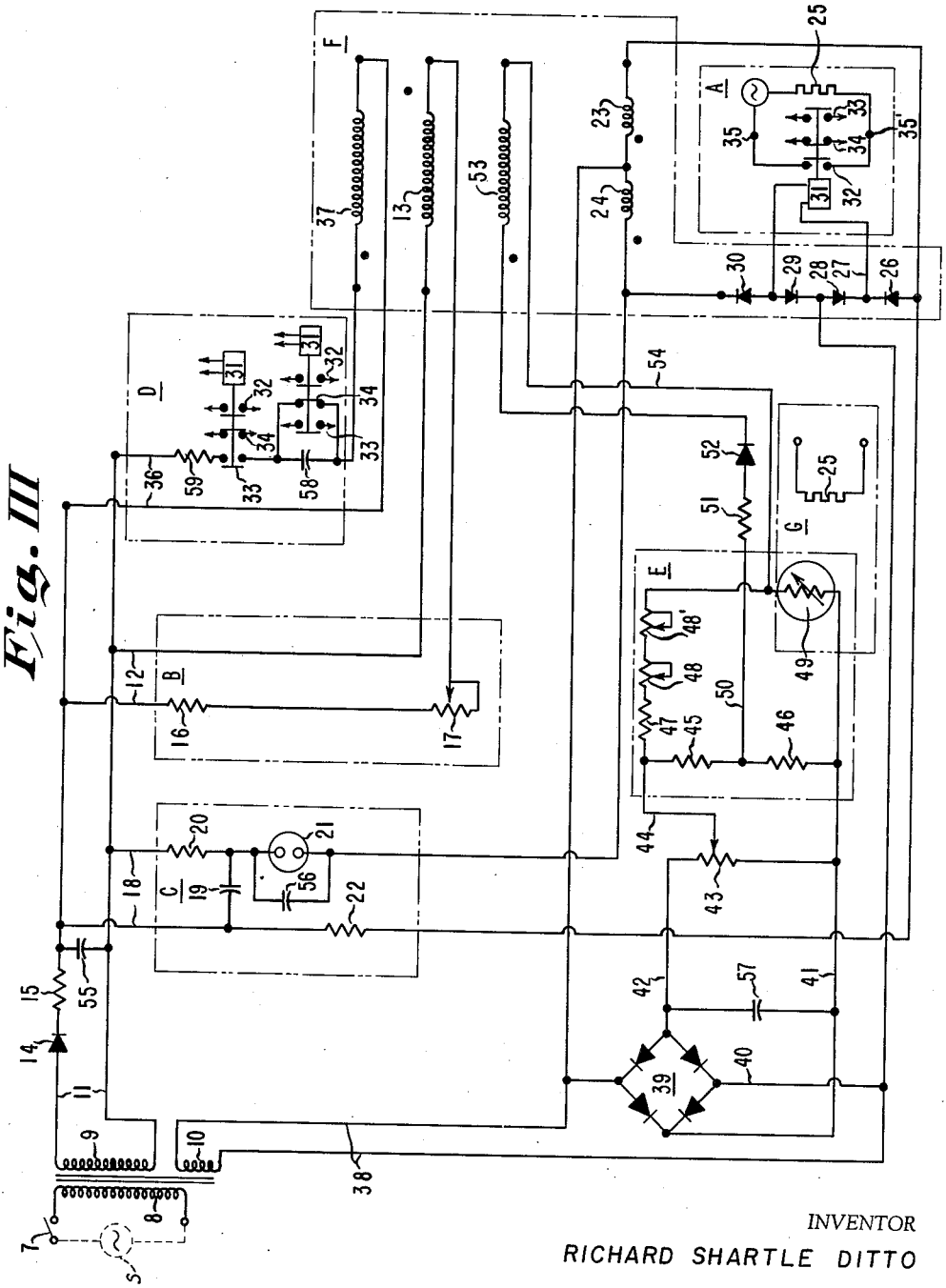

May 22, 1962 R. S. DITTO 3,036,188
HEATING APPARATUS
Filed Feb. 24, 1959 3 Sheets-Sheet 3
FIG. IV
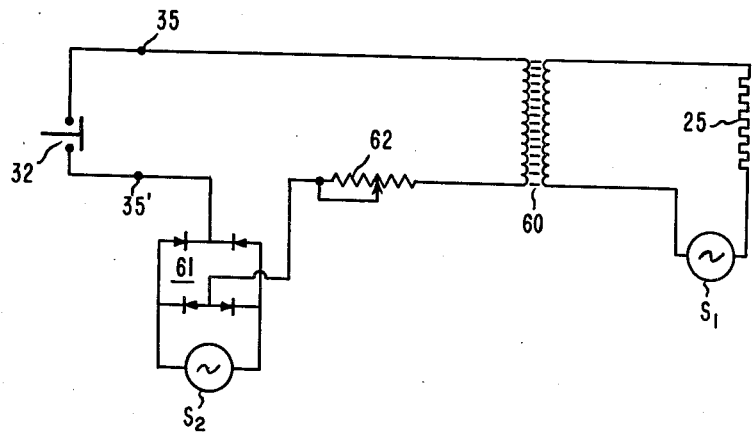
INVENTOR
RICHARD SHARTLE DITTO
BY Carl A. Hechmer
ATTORNEY United States Patent Office 3,036,188
Patented May 22, 1962

3,036,188
HEATING APPARATUS
Richard Shartle Ditto, Newark, Del., assignor to E. I. du Pont de Nemours and Company, Wilmington, Del., a corporation of Delaware
Filed Feb. 24, 1959, Ser. No. 795,137
3 Claims. (Cl. 219—20)

This invention relates to a closed loop condition-correcting control system. More specifically it is concerned with a novel and useful process and apparatus for maintaining an energy responsive system at a set value by time proportioning.

The object of this invention is to provide an electronic control method and apparatus of the time proportioning type characterized by simplicity, reliability, and low cost.

Another object is to perform time proportioning control in an improved manner employing only solely electrical physically stationary means to produce the periodic characteristic.

These and other objects will become apparent in the course of the following specification and claims.

In accordance with the present invention a process is provided for maintaining an energy responsive system at a substantially constant value wherein energy is provided to the system over a variable period of time at fixed intermittent intervals, the variable period being proportionately related to the deviation of the system from the constant value which comprises triggering and maintaining the energy with a signal from an amplifying means wherein the fixed intermittent intervals for operating the amplifying means is supplied by a cyclic energizing means while the length of the variable periods of operation are the resultant of (a) holding means for sustaining the signal from the amplifying means over a predetermined period (this period being less than that between the aforementioned, fixed intermittent intervals) and (b) sensing means opposing the holding means. Preferred apparatus suitable for accomplishing this purpose comprises a closed loop control system wherein condition-correcting means as the load of a biased self-saturating magnetic amplifier is cyclically responsive to a control signal resulting from the opposing of signals produced by (a) a sensing means, the signal of which is proportional in duration to the deviation of the controlled condition from a desired set point and (b) an independent intermittent signal of fixed duration.

The invention will be more readily understood by reference to the drawings.

FIGURE I is a functional schematic of the preferred embodiment of the invention wherein the load A of a magnetic amplifier F having biasing B is responsive to three signals, i.e., timing C which turns "on" the amplifier cyclically, proportioning D which holds the amplifier "on" for a fixed period and sensing E which turns "off" the magnetic amplifier, thereby controlling the length of the period held by proportioning D. The sensing circuit distinguishes the quantitative variation of the input (which is derived from the condition correcting means G and which is indicative of the "condition" of the system existing at any particular time) from the reference command (which is the condition desired).

The relation of the signals is shown in FIGURE II on a time line showing "off" and "on" variation of the magnetic amplifier with time. At "a" the timing device turns the magnetic amplifier "on" supplying current to load A and thereby activating the condition-correcting device. Upon being turned "on" the proportioning circuit D takes over at "b" and attempts to hold the magnetic amplifier in the "on" condition through the period shown from b to d. The sensing signal E however interrupts the duration of the proportioning signal D and cuts off the magnetic amplifier at c. In any operating system the length of b—d is predetermined and the point c will vary in response to the sensing signal, the deviation of the length b—c from its equilibrium position being proportional to the deviation of the condition of the system from the predetermined value set in the reference command.

FIGURE III is a circuit diagram of a preferred embodiment of the invention applied to a temperature controller employing the functions of the system outlined in FIGURES I and II. It is a time proportioning controller using a magnetic amplifier and associated signal relay and will operate from either a thermistor or a resistance bulb thermometer. Basically it is a suitably biased magnetic amplifier whose input or control signal is furnished by a sensing element which may be a thermocouple producing a voltage proportional to the temperature or it might be a resistance bulb or a thermistor or the like. The output power of the amplifier F operates the signal relay 31 which operates as a power relay as shown in FIGURE III or in turn can operate a saturable reactor, as shown in FIGURE IV that supplies power to the heater elements. The circuit elements in FIGURE III, which perform the functions described in the functional schematic FIGURE I, have been enclosed in broken lines and given capital letters corresponding to the appropriate functions. The magnetic amplifier load A is represented by a signal relay actuated by coil 31 and operating normally open contacts 32 and 33 and normally closed contact 34. Terminals 35 and 35' may be suitably connected in a power relay circuit as shown in FIGURE III or in a saturable reactor circuit as shown in FIGURE IV or the like, which in turn will actuate the energy receiving element. In FIGURE IV power source $S_1$ supplies energy to an energy receiving element, heater 25, when activated by a saturable reactor coil 60 which in turn receives its power, when contacts 32 are closed, from source $S_2$, rectified at bridge 61, suitably regulated by current limit resistor 62. An energy reciving element, heater 25 is indicated and enclosed by broken lines in condition-correcting circuit G which may be considered a furnace, oven or the like. The temperature produced is sensed by thermistor 49 in sensing element E thus performing the input function. A neon bulb relaxation oscillator performs the timing function C. The proportioning function D is performed by a simple capacitor charging circuit. The magnetic amplifier F is wound on two cores employing proportioning control coil 37, bias coil 13, sensing control coil 53, and A.-C. supply coils 23 and 24 and connected through a rectifier bridge composed of metallic rectifier elements 26, 28, 29, and 30. The read-out signal of the amplifier actuates signal relay coil 31. The sensing function E is performed with a Wheatstone bridge, one arm of which is a thermistor.

In operation the system is energized from an alternating current source S upon the closing of switch 7 in a lead to the primary winding 8 of a power transformer having secondary windings 9 and 10 for developing respectively high voltage D.C. power supply for the control functions and alternating current power supply for the magnetic amplifier. Secondary transformer coil 9 is connected by leads 11 and 12 to bias winding 13 of the 2-core magnetic amplifier, the alternating current being rectified by rectifier 14 to produce half-wave rectified pulsating D.C. which passes through current limiting resistance 15 in one of leads 12 and has filter capacitor 55 connected across both leads. Resistances 16 and 17 provide the biasing B necessary in the magnetic amplifier circuit resistance 17 being variable. It will be seen that a decrease in the amount of resistance in series in this circuit will decrease the bias. As is well known the magnitude of the biasing current is regulated to invert the transfer characteristic of an unbiased magnetic amplifier to produce a transfer characteristic such that with zero current in the control windings the load current will be zero as well.

Timing circuit C receives its power through leads 18, which are connected to leads 11 carrying the high voltage D.C. current. Capacitor 19 is charged through resistor 20 from the D.C. supply. When the voltage across the capacitor 19 reaches the firing voltage of the neon bulb 21 the bulb will briefly fire discharging the capacitor in a current pulse through resistor 22 and thence through the A.-C. supply windings 23 and 24 of magnetic amplifier 3. This pulse will be repeated at fixed intervals depending on the characteristics of capacitor 19 and resistance 20 relative to neon bulb 21. This will turn on magnetic amplifier F and create a current pulse in the actuating coil of signal relay 31. Capacitor 56, connected in parallel with neon bulb 21, prevents premature firing of neon bulb 21. The current pulse created by timing circuit C activates coil 31 closing the signal relay momentarily operating normally closed contact 34 and normally open contacts 32 and 33. Closing normally open contact 32 completes the circuit through terminals 35 and 35' and actuates the equipment sending power to heater 25 as has been explained previously. When normally closed contact 34 opens at the same time that normally open contact 33 closes, capacitor 58 begins charging through resistor 59 from D.C. leads 11 through leads 36, sending a signal of sufficient magnitude through control winding 37 of magnetic amplifier F to maintain a power "on" condition. Alternating current leads 38 in conjunction with A.-C. supply coils 23 and 24 and the rectifier bridge 26, 28, 29, and 30 will supply a unidirectional current through lead 27 to energize actuating coil 31. This condition will be maintained so long as capacitor 58 charges and produces a current of sufficient magnitude to hold in signal relay 31. The charging current in capacitor 58 decreases toward zero exponentially with time. This fact alone would allow the amplifier to turn itself off in due time. The components of proportioning circuit D, resistor 59 and capacitor 58, are so selected that the time of this turning off cycle is just slightly shorter than the cycle time of the timing circuit C. When the charging current in capacitor 58 falls below the current level at which signal relay 31 drops out, normally open contact 32 opens effectively stopping the supply of energy to the energy receiving device. Similarly normally open contact 33 opens disconnecting proportioning circuit D from its power source at the same time as normally closed contact 34 closes and completely discharges capacitor 58. Experience in applying circuitry of this type to the temperature control of small ovens and the like has shown that a timing cycle period of 8 seconds with possible variations from 5 to 12 seconds gives adequate control. The proportioning elements are so selected as to give a maximum turning off time of a few tenths of a second less than the timing cycle period selected if the proportioning function D acts unopposed by the sensing function E. However, the effect of the control current from sensing function E, in control winding 53 of magnetic amplifier F opposes the effect of the charging current from proportioning circuit D in control winding 37. The sensing function E comprises a Wheatstone bridge containing a thermistor 49 energized through leads 38 and rectifier bridge 39, which is connected across the leads 38 by means of lead 40. Capacitor 57 is connected across leads 41 and 42 to act as a filter. Rectifier bridge 39 creates a full wave rectified D.C. current on leads 41 and 42 which are connected through resistor 43, which is variably tapped by lead 44 so that the gain may be adjusted. Increasing the potential drop between leads 44 and 41 by means of variable resistor 43 will increase the gain of the system, by increasing the amount of low voltage D.C.

The bridge of the sensing circuit E is composed of four legs: resistors 45 and 46 each forming one of two legs; the third leg being formed by resistor 47 in series with variable resistors 48 and 48' which provide coarse and fine set point adjustment respectively; and the fourth leg of the bridge made up of thermistor 49. The output of the thermistor bridge passes through lead 50 to resistor 51 selected so as to isolate control winding 53. Rectifier 52 is placed in series with resistor 51 and control winding 53 to block the bridge output if it reverses as it might when temperature conditions become excessively hot. Lead 54 completes this part of the circuit rejoining control winding 53 and the thermistor bridge.

It will be seen that the timing circuit C energizes the magnetic amplifier F and hence energizes signal relay 31 at fixed time intervals simultaneously starting proportioning circuit D which regulates the "holding on" time. The "turning off" time will be the result of the combined action of the current from the proportioning circuit D acting on control winding 37 as opposed by the current from sensing circuit E acting on control winding 53, the current from the sensing circuit E being a direct function of the temperature. In normal operation the parameters of the system are so adjusted as to maintain the desired set-point temperature when the "on" and "off" times are approximately equal. As the temperature of the thermistor rises above the set point value, however, the control current increases and turns the amplifier off earlier in its cycle. This decreases the average energy supplied to the controlled system. Correspondingly, as the thermistor temperature drops below the set point the amplifier will turn off later in its cycle increasing that average energy supplied; thus the average energy supplied to the controlled system is continuously variable as a direct function of the deviation of the controlled variable from a desired set point.

Many equivalent modifications of the above will be apparent to those skilled in the art from a reading of the above without a departure from the inventive concept.

What is claimed is:

1. A heater control system providing a heater, a power source for the said heater, a temperature responsive element subjected to the temperature produced by the heater, switching means, a source of sustained alternating current, a source of sustained direct current, a source of cyclical, pulsed direct current, a source of periodically sustained direct current, the period of which is no greater than the cycle of the said cyclical, pulsed direct current, and a magnetic amplifier containing an alternating current supply coil, an energization maintenance coil and a sensing control coil; the said cyclical, pulsed direct current source and the said sustained alternating current source being connected to the said alternating current supply coil to cyclically initiate a series of pulses of current through the said alternating current supply coil, the period between the said pulses corresponding to the null period of the said cyclical pulsed direct current; the said switching means being responsive to the flow of current in the said alternating current supply coil and, during such flow, connecting the said periodically sustained direct current source to the said energization maintenance coil and connecting the said heater to its power source to raise the temperature; the flow of the said periodically sustained direct current through the said energization maintenance coil sustaining, for the duration of its period, the flow of current in the said alternating current supply coil; the said source of a sustained direct current being connected to the said sensing control coil, the said sustained direct current being opposite in direction to the said periodically sustained current flow in the said energization maintenance coil and opposing the effect of said periodically sustained current flow upon the flow of current in the alternating current supply coil, the magnitude of the said sustained direct current being inversely proportioned by the said temperature responsive element to the extent of the variation of the sensed temperature from a pre-selected value.

2. The system of claim 1 wherein the said magnetic amplifier is provided with a biasing coil, the said biasing coil carrying the output of an adjustably sustained direct current.

3. The system of claim 1 wherein the said switching means is a relay coil connected in series with the said amplifier.

References Cited in the file of this patent
UNITED STATES PATENTS

| | | |
|---|---|---|
| 2,341,526 | Breitenstein | Feb. 15, 1944 |
| 2,511,981 | Hanchett | June 20, 1950 |
| 2,872,556 | Obermaier | Feb. 3, 1959 |
| 2,938,387 | Hamilton | May 31, 1960 |